US006167983B1

United States Patent
Wunderlich et al.

(10) Patent No.: US 6,167,983 B1
(45) Date of Patent: Jan. 2, 2001

(54) PROCESS FOR PRODUCTION OF TUBE PROFILE ELEMENT WITH SWAGED CLOSED HEAD END AND MUFFLER SUSPENSION PRODUCED THEREBY

(75) Inventors: Horst Wunderlich, Neuenrade; Frank Fingerhut, Werl, both of (DE)

(73) Assignee: W. Lottgers GmbH & Co. KG, Neuenrade (DE)

( * ) Notice: Under 35 U.S.C. 154(b), the term of this patent shall be extended for 0 days.

(21) Appl. No.: 09/447,314

(22) Filed: Nov. 22, 1999

(30) Foreign Application Priority Data

Nov. 25, 1998 (DE) .............................. 198 54 284

(51) Int. Cl.[7] .............................. F01N 7/08; E21F 17/02; B21D 22/00
(52) U.S. Cl. ........................... 181/227; 181/207; 181/296; 248/58; 248/59; 248/49; 248/317; 248/322; 248/339; 72/352; 72/361; 72/367; 72/369
(58) Field of Search ..................................... 181/207, 208, 181/209, 227, 228, 296; 248/58, 59, 62, 67, 68.1, 322, 327, 339, 340, 341, 49, 317; 285/382, 222; 72/343, 352, 353.2, 356, 361, 367, 369

(56) References Cited

U.S. PATENT DOCUMENTS

| 4,116,411 | * | 9/1978 | Masuda ................................... 248/60 |
| 4,192,167 | * | 3/1980 | Huebner et al. ....................... 72/356 |
| 4,455,725 | * | 6/1984 | Van Baal ................................ 29/1.3 |
| 4,638,965 | * | 1/1987 | De Bruine et al. .................... 248/59 |
| 4,827,754 | * | 5/1989 | Tanaka ................................... 72/318 |
| 5,445,241 | * | 8/1995 | Nakamura et al. ................... 180/296 |
| 5,487,294 | * | 1/1996 | Petersen ................................. 72/370 |
| 5,673,877 | * | 10/1997 | Karner et al. .......................... 248/58 |

FOREIGN PATENT DOCUMENTS

405141237 * 6/1993 (JP) ..................................... 181/227

* cited by examiner

Primary Examiner—Robert E. Nappi
Assistant Examiner—Edgardo San Martin
(74) Attorney, Agent, or Firm—Flanagan & Flanagan; John R. Flanagan; John K. Flanagan

(57) ABSTRACT

A process for production of a tube profile element having a swaged closed head end includes the steps of chamfering an unswaged end of a tube profile element having a first diameter to provide a chamfered end on the tube profile element having a chamfer angle of less than 45° relative to a longitudinal axis of the end portion of the tube profile element, supporting the tube profile element in a retaining tool such that an end portion of the tube profile element having the unswaged chamfered end thereon extends beyond the retaining tool, providing a swage tool having a negative die capable of swaging the end portion of the tube into a swaged closed head end having a maximum second diameter larger the first diameter of the unswaged end of the tube, and moving the swage tool toward the end portion of the tube and swaging the unswaged chamfered end of the tube, by the negative die of the swage tool, into the swaged closed head end of the tube profile element. A muffler suspension made by the process includes a tube profile element of a first diameter and with a hollow interior, the tube profile element having a main body portion and opposite end portions. The main body portion has at least one bend formed therein. One of the opposite end portions has a swaged closed head end with a maximum second diameter larger the first diameter of the tube profile element and a fluid-tight configuration. The other of the opposite end portions has a fluid-tight configuration.

15 Claims, 1 Drawing Sheet

U.S. Patent   Jan. 2, 2001   US 6,167,983 B1

PROCESS FOR PRODUCTION OF TUBE PROFILE ELEMENT WITH SWAGED CLOSED HEAD END AND MUFFLER SUSPENSION PRODUCED THEREBY

BACKGROUND OF THE INVENTION

1. Field of the Invention

The present invention relates to a process for the production of a tube profile element with a swaged closed head end and to a muffler suspension produced by the process.

2. Description of the Prior Art

For suspending muffler installations on motor vehicles, suspensions fabricated from metal tube profile elements are known which are fastened at the motor vehicle end and at the end of the installation and which receive elastic vibration damping elements in order to connect the installation with the motor vehicle. For reasons of weight, tube profile elements are used which are curved or bent over and comprise at their free end a head-like swaging which serve for mounting a snapped-on vibration damping element.

Muffler suspensions of this type are either made of corrosion-free material or provided with corrosion-resistant coatings. While corrosion-resistant materials increase the material expenditures of such suspensions, coatings have the disadvantage that the coating material flows to a high degree into the tube profile elements, which requires high coating material expenditures and causes long curing times which is disturbing in the fabrication process. The open ends of such tube profile elements as muffler suspensions in motor vehicles additionally have the disadvantage that at high driving speeds noise is generated at the open sides.

There is a need for an innovation by which a tube profile element with a swaged head end can be closed in a manner simple in terms of fabrication technology and by which, in particular, in a cost-effective manner a tube profile element forming a muffler suspension can be produced.

SUMMARY OF THE INVENTION

The present invention satisfies the aforementioned need by providing a process for the production of a tube profile element with a swaged head end and to a muffler suspension produced by the process. In the production process, an end portion of the tube profile element to be swaged is received below the swaging length of the element in a retaining tool and the swaging of the end portion of the element to a greater diameter than the remainder of the element takes place via a swage tool having a negative die for the head end to be swaged. The swage tool is displaceable along the axis of the tube profile element. By the production process of the present invention the head end to be swaged, being open at a front face, is closed without additional working steps of different types. Furthermore, the other end portion of the tube profile element can be closed in simple manner during the production process, for example, by pressing it flat.

In carrying out the production process according to the present invention it is of particular significance first to chamfer the end portion of the tube profile element to be swaged. Then, through the engagement of the chamfered end portion of the element with the negative die in the swage tool during the swaging process bending of the inner edges of the bore of the element takes place up to the final closing and a subsequent cold pressing in the region to be closed occurs until completion of the formation of the desired form, given by the negative die, of the head end of the tube profile element which is of greater diameter than the remainder of the element. It is possible to attain deformation in this region using conventional swage tools and usual pressing pressures, which deformation leads to wall thicknesses of satisfactory mechanical strength and fluid-tightness. It is preferred that a wall thickness is attained in the region of the bore closure which corresponds approximately to the wall thickness of the tube profile element.

The present invention also is directed to a muffler suspension produced by according to the described process. Such a muffler suspension is a tube profile element having a main body portion bent over multiple times at an angle or in curved configuration and a swaged head at one end of the main body portion. The swaged head end of the tube profile element is closed and fluid-tight and has a mushroom-shaped configuration of greater maximum diameter than the main body portion of the tube profile element and at the other end the tube profile element is flattened and pressed together so as to be fluid-tight. When the muffler suspension made of a steel material is coated on the outside for purpose of corrosion resistance, the coating material is not capable of penetrating into the interior of the tube profile element since the tube profile element is tightly closed at both ends.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
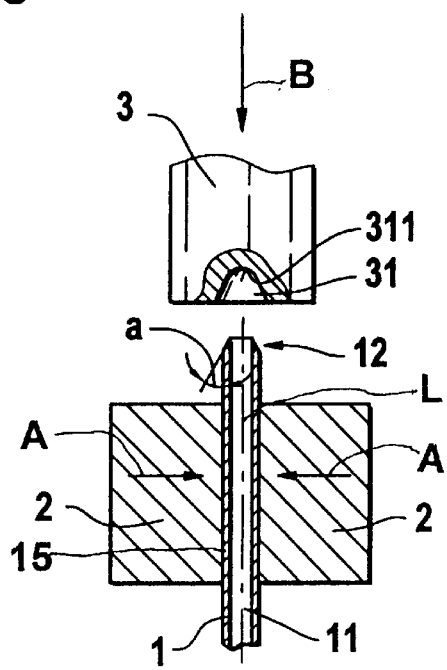
FIG. 1 is a schematic representation of a tube profile element after chamfering and before swaging the chamfered end portion according to the production process of the present invention.

Referring to the drawings and particularly to FIG. 1, there is illustrated a tube profile element 1 with a hollow open interior 11 and having a main body portion 15 and one opposite end portion 12 thereon which has been chamfered. The main body portion 15 of the tube profile element 1 is held by a retaining tool 2 in alignment with a swage tool 3. The swage tool 3 is movable axially toward the tube profile element 1 to swage the chamfered end portion 12 according to the production process of the present invention.

More particularly, the tube profile element 1 initially is clamped in the directions of arrows A as a blank in the retaining tool 2 at the main body portion 15 below the one opposite end portion 12 of the tube profile element 1, which one end portion 12 defines the swaging length of the element 1. The chamfer on the end of the one end portion 12 of the tube profile element 1 preferably extends at an angle a smaller than 45° relative to a longitudinal axis L of the tube profile element 1. The specific degree of this chamfering and the swaging length are a function of the inner diameter of the tube profile element 1, its wall thickness and its material.

Figure 2:
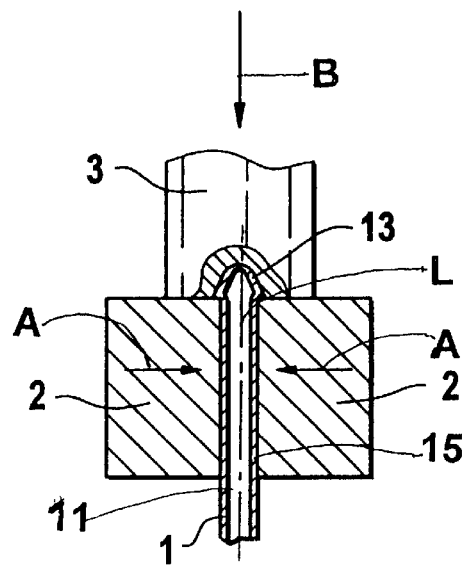
FIG. 2 is a schematic representation of the tube profile element after swaging of the chamfered end portion according to the production process of the present invention.

The swage tool 3 necessary for the swaging comprises a negative die 31, corresponding to the final shape of the head end 13, as shown in FIG. 2, of the tube profile element 1. The negative die 31 is provided with a desired rounded-off or spherical contour 311 to optimize the deformation causes as the negative die 31 swages the one end portion 12 of the tube profile element 1. For carrying out the swaging the swage tool 3 is moved in the direction of the arrow B.

Referring to FIG. 2, there is illustrated the tube profile element 1 after the swaging of the chamfered end portion 12 by the swage tool 3 has occurred so as to form the closed head end 13 with a mushroom shaped configuration and having an enlarged maximum diameter greater than the diameter of the main body portion 15 of the tube profile element 1. When the tool 3 is moved toward the tube profile element 1 and the swaging occurs the material of the chamfered end portion 12 of the tube profile element is initially bent and pressed inwardly and brought into contact so as to close the open interior of the tube profile element 1 at the one end portion 12. As the swaging continues, a form of cold-press welding takes place. The tube profile element 1 has at the end the form of the head end 13 evident in FIG. 2. The hollow interior 11 of the tube profile end 1 at the head end 13 is closed so as to be fluid-tight and, preferably, has a wall thickness which corresponds approximately to the wall thickness of the tube profile element 1.

Figure 3:
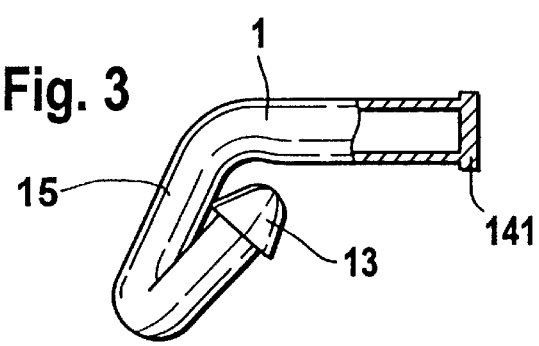
FIGS. 3 to 5 are elevational views of different embodiments of a muffler suspension formed by tube profile elements produced by the process of the present invention.
Figure 4:
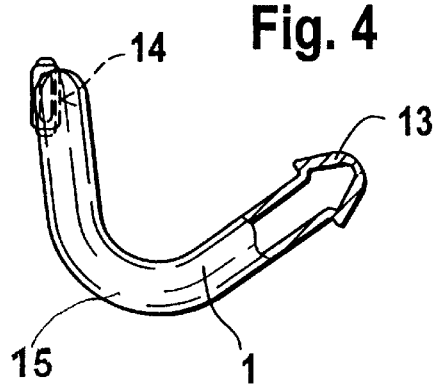
Figure 5:
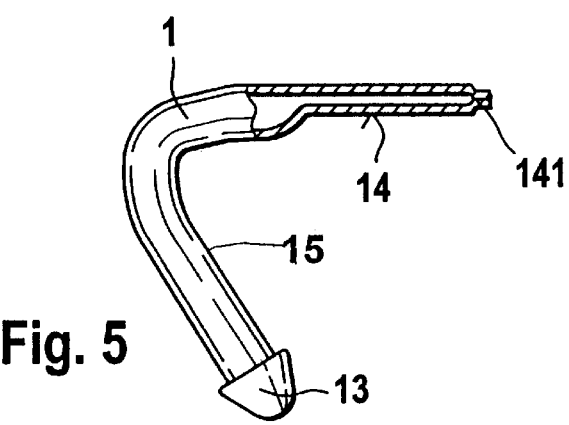

The tube profile element 1 depicted in FIGS. 3 to 5 forms several different embodiments of a muffler suspension for motor vehicles. According to the previously described process the closed mushroom-like head 13 of the greater diameter on the correspondingly chamfered end portion of the tube profile element 1. The main body portion 15 of the tube profile element 1 is bent-off or curved one or more times. At the other opposite end portion 14 of the tube profile element 1, a conventional tool (not shown) is used to provide a flattened configuration thereon and additionally the end 141 of the other end portion 14 is compressed tightly to provide the other end portion 14 with a fluid tight configuration. Thereby the tube profile element 1 providing the muffler suspension is closed tightly at both ends. The necessary deformation and bending-off processes can be carried out simultaneously in a simple manner on conventional machine units without changing over the workpieces. For this reason such the muffler suspensions are simple to produce in terms of fabrication technology and at reduced costs.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. Process for production of a tube profile element having a swaged closed head end, said process comprising the steps of:
   (a) chamfering an unswaged end of a tube profile element having a first diameter to provide a chamfered end on the tube profile element;
   (b) supporting the tube profile element in a retaining tool such that an end portion of the tube profile element having the unswaged chamfered end thereon extends beyond the retaining tool;
   (c) providing a swage tool having a negative die capable of swaging the end portion of the tube into a swaged closed head end having a maximum second diameter larger the first diameter of the unswaged end of the tube; and
   (d) moving the swage tool toward the end portion of the tube and swaging the unswaged chamfered end of the tube, by the negative die of the swage tool, into the swaged closed head end of the tube profile element.

2. The process of claim 1 wherein the unswaged chamfered end of the tube profile element has a chamfer angle of less than 45° relative to a longitudinal axis of the end portion of the tube profile element.

3. The process of claim 1 wherein the tube profile element has an open interior and the swaging of the end portion of the tube profile element includes cold pressing the end portion of the tube profile element so as to close the open interior of the tube profile element at the head end.

4. The process of claim 3 wherein the swaging of the end portion of the tube profile element includes deforming the end portion of the tube profile element until the swaged closed head end is fluid tight.

5. The process of claim 3 wherein the tube profile element has a given wall thickness and the swaging of the end portion of the tube profile element provides the swaged closed head end with a wall thickness approximately equal to the given wall thickness of the tube profile element.

6. The process of claim 1 wherein the swaged closed head end of the tube profile element has a mushroom-shaped configuration.

7. The process of claim 1 further comprising:
   pressing together an opposite end portion of the tube profile element to provide the opposite end portion with a flattened configuration.

8. The process of claim 7 further comprising:
   further pressing together an opposite end on the opposite end portion of the tube profile element to provide the opposite end with a flattened fluid-tight configuration.

9. The process of claim 1 further comprising:
   forming a plurality of bends in a main body portion of the tube profile element so as to provide the tube profile element with an angular shaped configuration.

10. The process of claim 1 further comprising:
    forming a curved bend in a main body portion of the tube profile element so as to provide the tube profile element with an arcuate shaped configuration.

11. A muffler suspension, comprising:
    (a) a tube profile element of a first diameter and with a hollow interior, said tube profile element having a main body portion and opposite end portions;
    (b) said main body portion having at least one bend formed therein;
    (c) one of said opposite end portions having a swaged closed head end with a maximum second diameter larger said first diameter of said tube profile element and having a fluid-tight configuration; and
    (d) the other of said opposite end portions having a fluid-tight configuration.

12. The muffler suspension of claim 11 wherein said other of said opposite end portions of said tube profile element is flattened so as to provide said fluid-tight configuration.

13. The muffler suspension of claim 11 wherein said swaged closed head end of the tube profile element has a mushroom-shaped configuration.

14. The muffler suspension of claim 11 wherein said at least one bend is a plurality of bends formed in said main body portion providing said tube profile element with a multiple angular shaped configuration.

15. The muffler suspension of claim 11 wherein said at least one bend is a curved bend formed in said main body portion providing said tube profile element with an arcuate shaped configuration.

\* \* \* \* \*